Sept. 8, 1925.
E. WILLIAMS
PLOW
Filed June 19, 1924
1,553,015
2 Sheets-Sheet 2
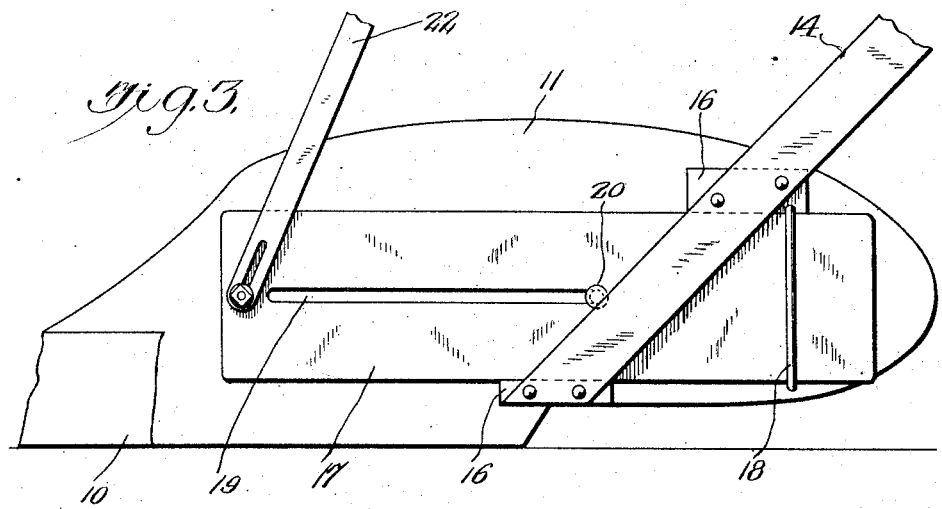
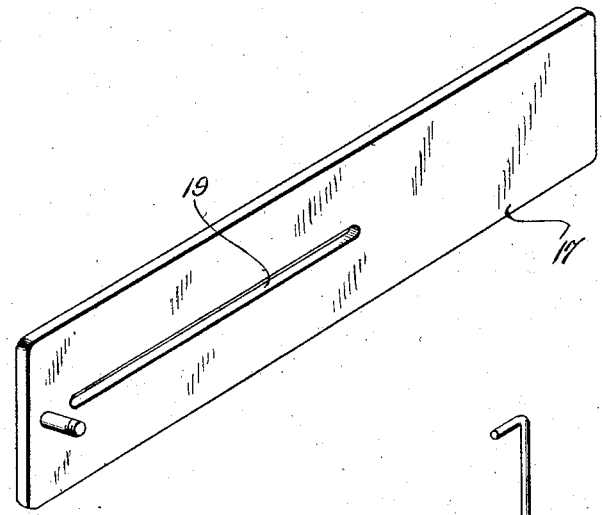
Inventor
Everett Williams,
By
Attorney Patented Sept. 8, 1925.

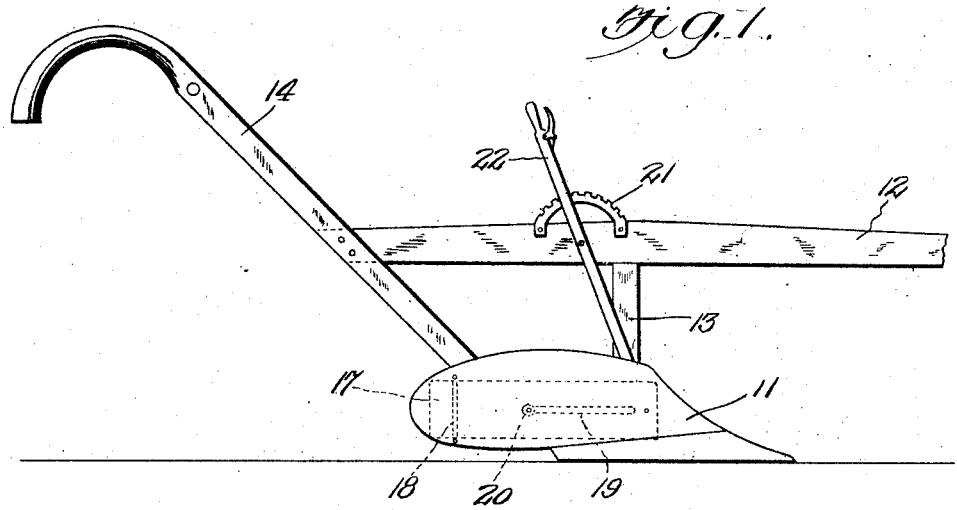
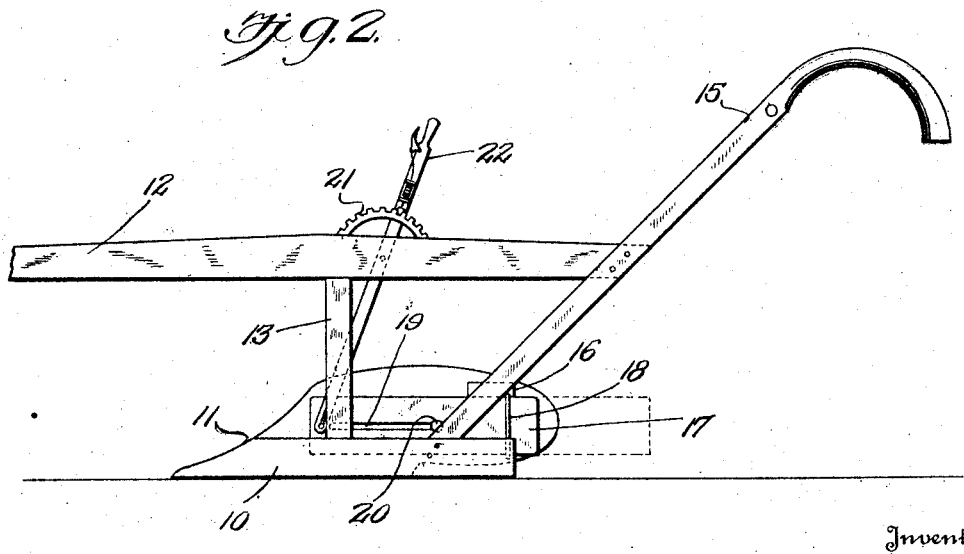

1,553,015

UNITED STATES PATENT OFFICE.

EVERETT WILLIAMS, OF PENNSVILLE, OHIO.

PLOW.

Application filed June 19, 1924. Serial No. 720,997.

*To all whom it may concern:*

Be it known that EVERETT WILLIAMS, a citizen of the United States, residing at Pennsville, in the county of Morgan and State of Ohio, has invented certain new and useful Improvements in Plows, of which the following is a specification.

This invention relates to plows and has special reference to a movable extension mold-board for breaking plows.

One important object of the invention is to improve the general construction and add to the efficiency of breaking plows such as are used in plowing hilly or rolling sections, the invention being especially valuable in turning the furrow on up-hill plowing.

A second important object of the invention is to provide improved extension means which may be employed without difficulty in a plow of ordinary construction.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a side elevation of a plow constructed in accordance with this invention, the same being taken from the right side.

Figure 2 is a similar view taken from the left side with the extension projecting rearwardly.

Figure 3 is a view similar to Figure 2 with the landside of the plow removed to better show the inside of the mold-board, and Figure 4 is a detail perspective view of the extension plate, and Figure 5 is a similar view of the guide for the rear end of the extension plate.

In carrying out this invention there is provided a plow which is here shown as an ordinary right hand end beam plow having landside 10 and mold-board 11. The beam of this plow is indicated at 12 and is connected to the landside and mold-board by a standard 13. To the mold-board and landside is also connected the plow handles 14 and 15 respectively, the plow handle 14 being offset inwardly from the inside of the mold-board by spacers 16. The rear end of the beam 12 is connected, as shown, to these plow handles.

The invention itself consists of a plate or bar 17 mounted between the handles 14 of the mold-board so as to slide in the space provided by the spacers 16. A guide 18 is provided on the rear of the mold-board through which the extension 17 also slides and furthermore the extension is slotted, as at 19, so that a bolt 20 may be passed through and not only aid in guiding the extension but may also act as a limiting stop. Mounted on the beam 12 is a quadrant 21 wherewith co-operates a latch lever 22 having its lower end connected to the forward end of the extension 17. This latch lever constitutes the operating lever of the device and, as will be obvious, movement of the latch lever projects the extension 17 rearwardly or retracts it in a forward direction in accordance with such movement.

In use, under ordinary conditions, the extension 17 is retracted, but when plowing up-hill the extension 17 is projected rearwardly and is found to greatly aid in proper turning of the furrow.

There has thus been provided a simple efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. The combination with a plow and its mold-board, of a plow handle, means to attach the plow handle to the inner side of the mold-board in spaced relation thereto, to form a guide slot, an extension plate slidable longitudinally of the mold-board in said guide slot, and means to project and retract said extension plate.

2. The combination with a plow and its mold-board, of a plow handle, means to attach the plow handle to the inner side of the mold-board in spaced relation thereto, to form a guide slot, an extension plate slidable longitudinally of the mold-board in said guide slot, means to project and retract said extension plate, and a pin and slot connection between the extension plate and mold-board to constitute additional guide means and movement limiting means.

In testimony whereof he affixes his signature.

EVERETT WILLIAMS.